United States Patent [19]
Vallauri et al.

[11] Patent Number: 5,800,886
[45] Date of Patent: Sep. 1, 1998

[54] ELASTIC SLEEVE SUPPORT

[75] Inventors: Ubaldo Vallauri, Monza; Francesco Portas, Quattordio, both of Italy

[73] Assignee: Pirelli Cavi S.p.A., Italy

[21] Appl. No.: 619,992

[22] Filed: Mar. 21, 1996

[30] Foreign Application Priority Data

Mar. 27, 1995 [IT] Italy .................. MI95A0606

[51] Int. Cl.$^6$ ................. F16L 11/16; B29C 47/00
[52] U.S. Cl. .............. 428/35.8; 428/34.9; 428/35.1; 428/37; 428/906; 138/129; 138/131; 29/235; 29/450; 156/149; 156/165; 156/244.13; 156/244.24
[58] Field of Search ............... 428/34.9, 35.1, 428/37, 906, 35.8; 138/129, 131; 174/DIG. 8, 73.1; 156/149, 165, 244.11, 244.12, 244.13, 244.17, 244.24; 29/235, 450

[56] References Cited

U.S. PATENT DOCUMENTS

| | | | |
|---|---|---|---|
| 2,661,025 | 12/1953 | Brace | 138/56 |
| 4,289,553 | 9/1981 | Nolt | 428/34.9 |
| 4,389,440 | 6/1983 | Keith | 428/34.9 |
| 4,717,608 | 1/1988 | Meltsch | 428/34.9 |
| 4,871,599 | 10/1989 | Knorr | 428/34.9 |
| 5,087,492 | 2/1992 | Vallauri et al. | 428/34.9 |
| 5,271,975 | 12/1993 | Solano | 174/DIG. 8 |
| 5,492,740 | 2/1996 | Vallauri et al. | 428/35.1 |
| 5,560,969 | 10/1996 | Portas | 174/DIG. 8 |

FOREIGN PATENT DOCUMENTS

| | | |
|---|---|---|
| 0500216A2 | 8/1992 | European Pat. Off. . |
| 1450348 | 4/1969 | Germany . |
| 2184193 | 8/1986 | United Kingdom . |

*Primary Examiner*—Rena L. Dye
*Attorney, Agent, or Firm*—Brooks Haidt Haffner &Delahunty

[57] ABSTRACT

The support is designed to keep in expanded condition an elastic covering sleeve for elongated cylindrical elements such as electric cable joints and the like. The support comprises a tape wound spirally in side-by-side turns so as to take on a cylindrical tubular form and mutual constraint means between the turns to keep the tape in wound condition. In accordance with the invention the tape and the constraint means are provided in different materials.

13 Claims, 2 Drawing Sheets

ELASTIC SLEEVE SUPPORT

SUMMARY OF THE INVENTION

The present invention relates to a support for keeping in expanded form an elastic covering sleeve for elongated cylindrical elements such as electric cable joints and the like and to a process for the realization of such a support.

For covering elongated elements such as particularly medium-high voltage electric cable joints there are known elastic sleeves termed also self-contracting or cold-contracting in contrast to sleeves of other types such as heat-contracting. These sleeves comprise an elastic tubular structure (in which are incorporated all the functional elements necessary for the specific application, e.g. electric field control layers, insulating layers, etc.) which before application is kept in an expanded condition to permit its fitting over the element to be covered while after application it is elastically fitted in a more or less forced manner on the element.

To keep the sleeve in expanded condition a tubular cylindrical support is used on which the tubular elastic structure is fitted in elastically expanded condition. The support is removed once the sleeve is positioned on the element to be protected thus permitting elastic contraction of the sleeve on the element.

Different types of supports are known. A particularly widespread type is that where the tubular cylindrical support consists of a tape wound spirally in side-by-side turns bound to each other in various ways. Examples of this type of support are described in GB-A-1292608, U.S. Pat. No. 4389440, EP-A-0291203. Removal of the support is obtained by progressive collapse of the support done by pulling the tape so as to progressively unwind the turns. Naturally the traction takes place from the inside, i.e. the end of the tape which is pulled is passed inside the support until it emerges at the opposite end. Indeed, the part of the sleeve already contracted and tightened on the cylindrical element to be protected prevents passage of the tape to be unwound.

The support is normally implemented starting from a tube of suitable polymeric material which is subsequently cut spirally to define the tape. This is the case e.g. of the supports described in GB-A-1292608 and in EP-A-0291203. As an alternative the support can be provided starting with a tape of suitable polymeric material which is wound spirally and then melted locally to weld the adjacent turns. This is the case e.g. of the support described in U.S. Pat. No. 4389440.

A support of this type must possess certain requisites to correctly fulfil the required function.

First of all, the external surface of the support must be flat and smooth to prevent damage to the sleeve. Indeed, during storage the strong pressure exerted by the sleeve due to elastic expansion could cause permanent reproduction (i.e. not completely recoverable elastically upon removal of the support or recoverable only in too long a time for correct use of the sleeve) on the inner surface of the sleeve of any irregularities on the outer surface of the support.

Then the support must have a radial compression strength capable of withstanding the pressure of the sleeve even for a long period of time at storage temperature without collapsing. In application on medium-high voltage electric cable joints the pressure exerted by the sleeve easily reaches levels near 1 MPa.

In particular it is known that the critical pressure per unit of length $\sigma_{cr}$ of a circular ring subjected to uniform pressure is given by $$\sigma_{cr} = 3EJ/R^3 \tag{1}$$

where E is the modulus of elasticity, J is the moment of inertia and R is the inside radius of the ring (see Timoshenko and Gere, "Theory of Elastic Stability", McGraw Hill, second edition, page 289 and following). In this case the moment of inertia J is given by $$J = S^3/12 \tag{2}$$

where S is the thickness of the ring (see the above mentioned paper, page 282).

The thickness of the tubular support is thus conditioned by the requirement of ensuring sufficient resistance to external pressure to avoid collapse of the assembly.

Furthermore the tensile strength of the tape and the toughness with which the turns are bound together must allow collapse of the support in the manner indicated while preventing absolutely that tensile stress applied to the tape might tear the tape instead of unwinding it progressively. This would require removal of the sleeve initially applied and starting the operation over with a new sleeve.

This happens for example with supports of homogeneous plastic material in which the turns are defined by means of a spiralling blind groove made in a starting tubular element since it is critical to hold the residual thickness at the bottom of the groove constant during processing. This residual thickness must be small enough to be tearable with a tractive force which would not cause breakage of the tape, without however the groove piercing and endangering the integrity of the support. Excessive residual thickness due e.g. to dimensional defects in the starting tubular element or imperfections in the grooving process could cause local increases in the tractive force to be applied to the tape to unwind it and possible causes of breakage.

Again, the tape must have the smallest size possible to pass easily during unwinding in the space between the internal surface of the support and the external surface of the element to be protected. The reduced dimensions of the tape are also important to permit the same sleeve to be used on elements having a range of diameters as broad as possible. Indeed, given a certain sleeve, the minimum diameter of the element to be protected depends exclusively on the elastic contraction capacity of the sleeve. The maximum diameter depends on how much space is available within the support considering that the tape must also be able to pass between the element to be protected and the internal wall of the support during its unwinding.

Lastly, it is necessary to limit the number of turns to shorten unwinding time as much as possible. Indeed, the tape unwinding operation requires that the straight pulling of the tape take place with intervals of periodic rotations around the element of the unwound tape. Otherwise, since the point of unwinding of the tape follows the spiral of winding of the support the unwound tape would tend to progressively kink on the element and prevent further unwinding. The number of rotations necessary for complete unwinding of the tape is theoretically equal to the number of turns even though in practice it is less because normally rotation becomes superfluous towards the end of the unwinding. A large number of turns thus implies both great length of the tape to be unwound and the need to perform a large number of rotations.

There is thus the problem of providing a support of the above type which would satisfy as much as possible the above mentioned requirements.

Accordingly, in a first aspect thereof the invention relates to a support for keeping in expanded condition an elastic sleeve for covering elongated cylindrical elements such as electrical cable joints and the like and comprising a tape wound spirally in side-by-side turns so as to take on a cylindrical tubular form and means of mutual constraint between the turns to hold the tape in wound condition and characterised in that the tape and the constraint means are made of different materials.

Differentiation of material between the tape and the constraint means permits maximum freedom of choice for both.

Preferably the tape is realized with an elastic material having an elasticity modulus of at least 150,000 MPa and in which the mutual constraint means between the turns comprise a layer of thermoplastic covering material on the tape heat welded between adjacent turns.

The thermoplastic material permits easy implementation of the constraint means by heat welding while it has been verified that if the tape material has a high modulus of elasticity the necessary resistance of the support to the pressure of the sleeve is ensured even with reduced tape thickness. Reduction of the tape thickness permits less radial space occupied for the support and less space occupied by the tape during unwinding and thus requires less space between the support and the cable sheath.

Advantageously the elastic material is steel and preferably harmonic spring steel. This is a material suited for the purpose thanks to its high modulus of elasticity of approximately 210,000 MPa which is essentially unaffected in time and insensitive to surrounding temperature increases. In addition it is economical and readily available.

With such a material application of formulas (1) and (2) mentioned above in the case of a tape made from strap having a thickness of S=0.5 mm with a winding radius of R=25 mm leads to a critical pressure of $\sigma_{cr}$=0.42 MPa. For a thickness of 0.6 mm the calculation gives a critical pressure of $\sigma_{cr}$=0.72 MPa. Surprisingly it was found that with a tape having a thickness of only S=0.3 mm there is obtained a support capable of withstanding without collapsing an elastic sleeve for medium-voltage electric joints with measured pressures on the order of 0.7 MPa.

Preferably the tape is in essentially straight condition at rest and, after removal of the mutual constraint means between the turns, tends to return to this essentially straight condition. This greatly facilitates removal of the support because it contributes to straight arrangement of the tape in the support while the support is pulled.

Application of the thermoplastic material on the tape can take place advantageously by extrusion with optional interposition of an adhesive. In this manner excellent adhesion of the thermoplastic material to the tape is achieved in a structurally simple manner.

In a second aspect the present invention relates to a process for the realization of a support for keeping in expanded condition an elastic sleeve for covering elongated cylindrical elements such as electric cable joints and the like and characterized in that it comprises the phases of:

winding spirally a tape with side-by-side turns on a cylindrical arbour, and
  constraining mutually the side-by-side turns by means of constraint means made of a material different from the material of the tape.

This process permits controlling the constraint between the turns in a manner independent of the characteristics of the tape material.

Preferably the process also includes the phases of:
  providing the tape in an elastic material having an elasticity modulus of at least 150,000 mpa.

extruding on this tape a layer of thermoplastic covering material,
  winding on the arbour the tape bearing the layer of extruded covering,
  heating the covering layer up to the softening limit of the thermoplastic material, and
  applying a pressure on the covering layer before cooling thereof to achieve heat welding of the adjacent turns.

Preferably the process also includes the phase of applying a coat of adhesive on the tape before extruding thereon the covering layer. This ensures maximum toughness of binding of the thermoplastic covering to the tape.

Additional characteristics and advantages of the present invention are clarified by the description given below of a preferred embodiment of a support in accordance with the invention given with reference to the annexed drawings wherein.

Figure 1:
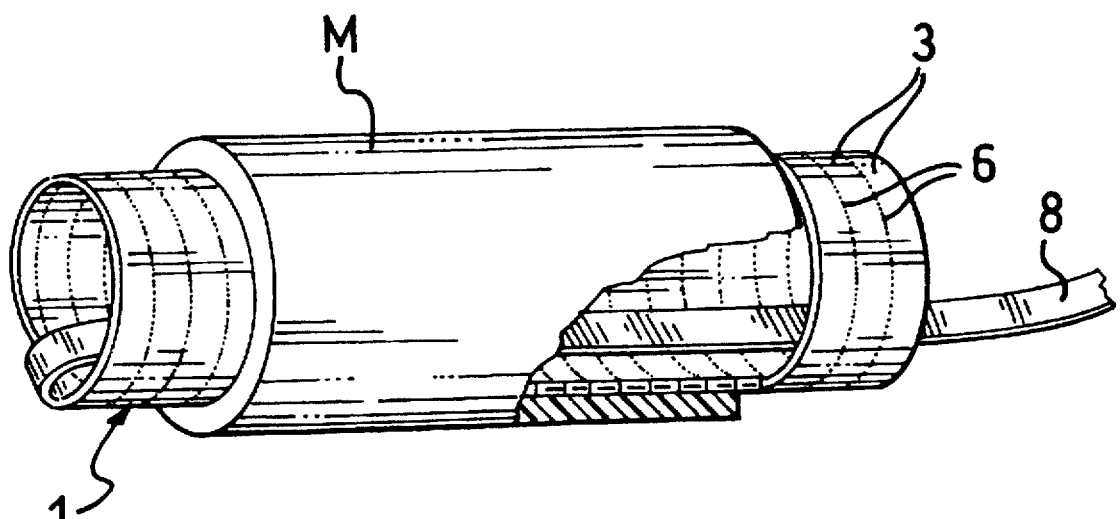
FIG. 1 shows a perspective cross section view of a support in accordance with the present invention with an elastic sleeve shown diagrammatically fitted over it.
Figure 2:
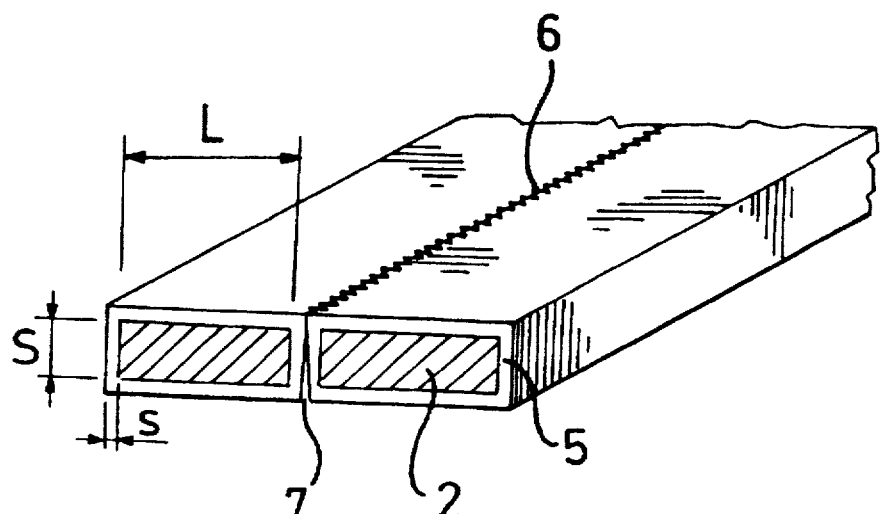
FIG. 2 shows a perspective cross section view of two adjacent sections of tape of the support of FIG. 1.
Figure 3:
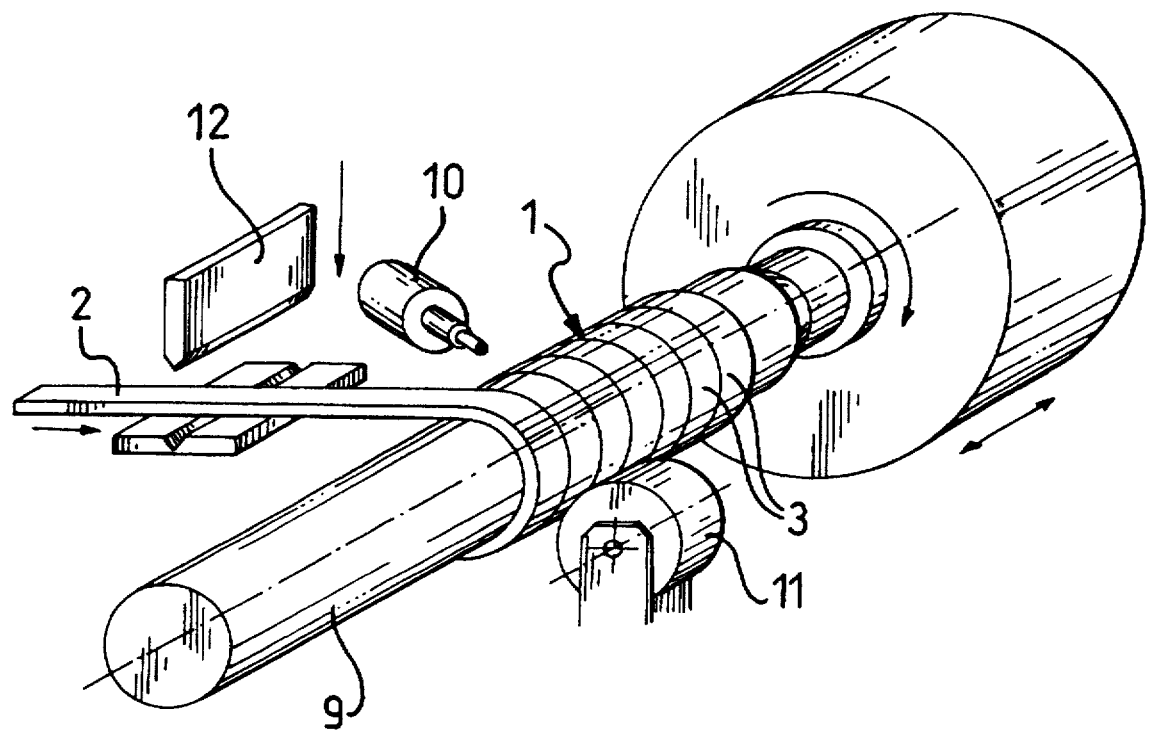
FIG. 3 shows a diagrammatic perspective view of an apparatus for implementation of the support of FIG. 1.

In the FIGS. reference number 1 indicates as a whole a support for keeping in expanded condition an elastic sleeve M which is indicated only diagrammatically in FIG. 1. The support is indicated by 1 both in FIG. 1 where it is shown finished and in FIG. 3 where it is shown being produced.

The support 1 is provided by a tape 2 wound spirally in side-by-side turns 3 so as to take a cylindrical tubular form. The tape 2 is provided with a covering layer 5 which wraps the entire section of the tape 2.

The adjacent turns 3 are heat welded together in correspondence of the exterior of the support 1 along a welding line 6. In correspondence of the interior of the support 1 the adjacent turns 3 are merely brought close together, i.e. separated by a cut 7.

The tape 2 has an unwound end 8 folded back inside the support 1 opposite one end of the support and extended in a straight line in the support 1 until it emerges from the opposite end thereof.

The tape 2 is made of an elastic material having a high modulus of elasticity, greater than 150,000 MPa. The elastic material of the tape 2 is preferably steel and still more preferably harmonic spring steel. The elasticity modulus of this material is approximately 210,000 MPa which is maintained in time even under severe environmental conditions such as moisture and high temperature.

Thanks to the elasticity modulus of the material the tape 2 can have a very small thickness S. For use with medium-high voltage electric cable joint covering sleeves it is believed that a thickness S of the tape 2 might be preferably between 0.2 mm and 0.8 mm.

The covering layer 5 is provided with a thermoplastic material applied on the tape 2 preferably by extrusion and with a thickness of 0.1 mm to 0.2 mm by conventional techniques. The thermoplastic material can be chosen in a variety of easily extrusible polymeric materials such as e.g. plasticised polyvinyl chloride (PVC), high- or low-density polyethylene (PE), polyamides, ethylene-vinyl acetate copolymers (EVA), ethylene-ethyl acetate copolymers (EEA), ethyl-butyl acrylate copolymers (EBA), ethyl-acid acrylic copolymers (EAA) and the like.

Binding achieved by extrusion of the above mentioned materials on the steel is good in itself but can be improved by applying on the tape 2 before extrusion a layer of adhesive material such as e.g. an adhesive of the so-called instant type, e.g. cyanacrylic, or the so-called "hot-melt" type, e.g. with a polyamide base or an EVA copolymer base.

As an alternative to the application of a layer of adhesive material the required adherence can be achieved by using for the covering layer 5 a material chosen from among the polymers indicated above with specific adhesive characteristics. These polymers have a tendency to adhere to many surfaces, whether metallic or polymeric, and in particular they adhere well to steel. In addition these polymers, despite their adhesiveness, are easy to extrude.

Examples of such adhesive polymers are EAA, EVA and polyamides. In particular an EAA copolymer denominated PRIMACOR 3442 of the Dow Chemical Company has been tested. Another EAA copolymer is called NUCREL ARX 48 of the DuPont Company. By using a conventional extruder for polyethylene with melting temperature between 180° an 280° excellent adhesion to the steel tape was obtained without the interposition of any adhesive. The mechanical and thermal characteristics of the EAA are very similar to those of low-density PE and therefore the characteristics of the support and its realization procedures are fully equivalent.

Realization of the support 1 takes place as follows. First there is applied the covering layer 5 on the tape 2 by means of extrusion. The covered tape can be used directly for producing supports 1 or even wound on spools and stored. The tape 1 covered with the layer 5 is wound on a shaft 9 rotating and moving axially while taking care that the turns 3 which are progressively formed are adjacent to each other. This is achieved in a known manner by choosing and controlling appropriately the rotation speed and traversing speed of the shaft 9. While the tape 2 is wound the turns 3 just formed are heated by a heating system (diagrammed in FIG. 3 as a blower 10) and pressed by a straightening roller 11. This causes formation of the weld lines 6 between adjacent turns 3. After reaching the desired axial length of the support 1 the feeding of the tape 2 is stopped, the tape 2 is cut by a cutting apparatus (diagrammed in FIG. 3 as a blade 12) and the support 1 is drawn from the shaft 9. The end 8 of tape 2 which remains free is folded back in the support 1 and made to emerge at the opposite end.

In practice a tape 2 of harmonic spring steel with a thickness S of 0.3 mm and width L of 3 mm was used. For the covering layer 5 there was used low-density PE (RIBLENE MV 10 of the Enichem Company) extruded at 130° on the tape 2. Before the extrusion on the tape 2 there was applied a cyanacrylic adhesive (LOCTITE 406). Subsequently the covered tape was wound on a shaft. During winding the external surface was heated to 150° and pressed to achieve heat welding of the turns 3.

It has been found that the support 1 thus realized was capable of withstanding an external radial pressure of 0.7 MPa. The tape 2 was capable of withstanding without breakage a tensile stress of 300N. The strength of the weld line 6 of the covering layer 5 proved to be essentially negligible. In addition, in the separation of the turns 3 of the tape 2 the tearing of the thermoplastic material of the covering layer 5 did not leave detached pieces which could have damaged the functionality of the sleeve by falling between the sleeve and the element to be protected.

As shown by the above description the present invention permits achieving considerable advantages as compared with the prior art.

First of all, the radial space occupied by the support is significantly less than that of known supports just as the space occupied by the tape during unwinding is significantly less. This permits using the same sleeve on elements having a rather large range of diameters.

In addition, the high strength of the tape completely avoids the risk of breakage of the tape during unwinding. The use of different materials for the tape and the constraint means of the turns allows selection for the tape of materials having a high elasticity modulus and high tensile strength, and for the constraint means of materials having low tear resistance, freeing correct operation of the support from the critical nature of dimensions as could happen with known supports made with homogeneous materials.

Furthermore, the elasticity of the tape material tends to return the tape to relaxed condition as soon as freed from the constraint of the weld lines thus facilitating withdrawal from the opposite end of the sleeve and reducing the risk of kinking around the element to be protected.

It should also be noted that the tape even if with potentially cutting sharp edges cannot during unwinding cause any damage to the sleeve or to the element to be protected because it is always covered by an essentially soft and not cutting thermoplastic material.

Lastly, the realization of a support in accordance with the invention is very simple. In particular it is possible to achieve supports of different diameters merely by winding the tape on shafts having different diameters.

EXAMPLE

For use in the realization of medium-voltage electric cables with extruded insulation the dimensions called for in France (see Table 1 of "Electricité de France" Standards HN 33 S 23) vary between a minimum diameter of 19.9 mm on the insulation of the minimum cross-section cable (50 $mm^2$) and a maximum diameter of 44.5 mm on the external sheath of the cable with maximum conductor cross section area (240 $mm^2$).

In accordance with the present invention a support was prepared with an outside diameter of 49 mm and inside diameter of approximately 48 mm realized with a steel tape having a thickness of approximately 0.3 mm and width 3 mm and covered with a layer of low-density polyethylene with thickness of 0.1 mm to 0.2 mm approximately as described above which ensured constraint of the wound tape turns. Over said support was expanded an elastic sleeve with inside diameter of 14 mm.

The joint consisted of a sleeve with several layers in EPR-based compounds. In particular the joint was a unit consisting of an internal sleeve comprising, from the interior outward, a field-control layer, an insulating layer and a semiconductor layer. Further outward there was a semiconductor sheath fitted with negative allowance, a shield in the form of copper braid and an elastic protective sheath also fitted with negative allowance on the preceding layers with the side edges turned back to allow installation of the joint on the cables.

The degree of reticulation of the compounds used for the different layers was 95% to 100% for all layers.

The sleeve at rest had a total thickness of approximately 17 mm and a mean elasticity modulus of approximately 1.5 MPa. The tubular support had a length of 550 mm and the sleeve had a length of 450 mm.

Expansion imposed on the sleeve was 250% which corresponds to a pressure on the tubular support of approximately 0.7 MPa.

The inside diameter of the support of 48 mm combined with a space occupied by the tape of approximately 1 mm inside the support permitted fitting of the assembly over the outer sheath of the cable of maximum expected conductor cross section area (240 mm²) having a diameter of 44.5 mm.

The unit formed by the expanded sleeve on the support was kept for a period of 6 weeks at 65° C. simulating 2 years of storage at surrounding temperature (20°). No significant structural yielding or deformation of the tubular support appeared during this period.

Subsequently the sleeve was applied on a cable joint having minimum expected conductor cross section area (50 mm²), equal to an insulation diameter of 19.9 mm by pulling on the free end of the tape in accordance with the above described procedure. The temperature at the time of application was near 0° C.

Under these application conditions (particularly severe due to the elastic behaviour of the sleeve materials) the sleeve exerted a pressure of 0.15 MPa a few minutes after removal of the tubular support. The joint was tested electrically 20 minutes after application of the sleeve and proved to be perfectly functional.

The above-indicated dimensioning was due to the fact that with the materials used, it was observed that to ensure good pressure (at least 0.1 MPa to 0.2 MPa) on the insulation of the smallest cable at the moment of assembly a nominal negative allowance of approximately 35% to 40% must be provided between the internal diameter of the sleeve at rest and the outside diameter of the cable insulation on which it must exert this pressure.

In this case the sleeve for the cable having cross section area of 50 mm² had an internal diameter of 19.9 mm/1.4 mm=14 mm which corresponds to a nominal negative allowance of 40%.

With conventional supports made of homogeneous polymeric material, to use a single sleeve to cover the entire range of cables required it would be necessary to have a support with inside diameter greater than 44.5 mm plus the space occupied by the free end of the tape to be able to position the sleeve expanded on its support on the cable sheath before performing the connection of the conductors. In practice the inside diameter of the support would have to be at least 50 mm.

An inside diameter of 50 mm would imply an outside diameter of at least 56 mm (thickness of the support wall of approximately 3 mm, sufficient to withstand the external pressure applied to the sleeve).

If a sleeve with an inside diameter of 14 mm were fitted on a support with an outside diameter of 56 mm it would have to be expanded 300%.

Experience showed that it is practically impossible to impose such a high expansion and simultaneously ensure good spring back so as to exert sufficient pressure even in case of minimum cross section area upon application or within a few minutes thereof and in particular after long periods of storage and with low laying temperatures, e.g. 0° C. to 5° C.

The experiments made by the applicant showed that to have a satisfying result it is necessary to allow for the expandability of the compounds used to form the different sleeve layers and the spring back capability of the compounds.

In particular, during the experimentation which led to the present invention it was observed that the sleeves realized with the test materials described above with a reticulation degree of 95% to 100% and subjected to 300% expansion showed tearing of the innermost, field control, layer, which was the most stressed during the storage simulation period.

Some sleeves were also realized with only the innermost layer having the greatest expandability and employing the same material but keeping the degree of reticulation lower, i.e. from 60% to 70%. These sleeves did not show tearing during the storage simulation period (6 weeks at 65° C.)

These sleeves were then applied to the joints of the above mentioned cables under the same laying conditions described above at a temperature of approximately 0° C.

Under these conditions, upon laying the sleeves did not exert an acceptable pressure on the cable insulation and slid thereon and this condition of insufficient pressure continued for several minutes after application (10 to 20 minutes).

With the sleeves realized with present materials it is believed therefore that acceptable expansions for purposes of spring back and material strength should be on the order of 200% to 250% while higher expansions do not give acceptable results.

In this case, with the conventional supports one is forced to use at least two different sleeve sizes to cover the range of cables provided, e.g. a sleeve with inside diameter of 14 mm expanded on a support with outside diameter of 46 mm for conductor cross section areas from 50 mm² to 95 mm² and another sleeve with inside diameter of 17 mm expanded on a support with outside diameter of 56 mm for conductor cross section areas from 95 mm² to 240 mm².

Conversely, with a support in accordance with the present invention comprising a portion with high elasticity modulus and high structural strength forming a continuous spiral and a portion of low-strength material designed to hold the turns of the spiral constrained in a tearable manner, it is possible to size the support with a thin wall without endangering structural strength and thus allowing limitation of the expansion to be applied to the sleeve to be fitted on the support so as to be able to use a single sleeve to cover all the cross section areas from 50mm² to 240 mm² without the sleeve having to withstand excessive expansion values.

We claim:

1. Support for keeping in expanded condition an elastic sleeve for covering elongated cylindrical electrical elements and comprising a tape wound spirally in side-by-side turns so as to take on a cylindrical tubular form and means of mutual constraint between the turns to hold the tape in wound condition and characterised in that the tape and the constraint means are made of different materials and the tape is made of an elastic material having an elasticity modulus greater than 150.000 MPa.

2. Support in accordance with claim 1 wherein the mutual constraint means between the turns comprise a layer of thermoplastic covering material encircling the tape and with the material on turns fused with the covering material on adjacent turns.

3. Support in accordance with claim 2 wherein the thermoplastic material is extruded on the tape.

4. Support in accordance with claim 3 wherein the thermoplastic material is a polymeric material chosen from a group comprising plasticised polyvinyl chloride (PVC), low- or high-density polyethylene (PE), polyamides, ethylene-vinyl acetate copolymers (EVA), ethylene-ethyl acetate copolymers (EEA), ethyl-butyl acrylate copolymers (EBA), ethyl-acid acrylic copolymers (EAA) and the like.

5. Support in accordance with claim 4 wherein the polymeric material possesses adhesive properties towards the elastic material of the tape.

6. Support in accordance with claim 3 wherein between the tape and the covering layer is interposed a layer of material possessing adhesive characteristics towards the elastic material of the tape.

7. Support in accordance with claim 1 wherein upon severance of said mutual constraint means, the elasticity of said tape is such as to cause said tape to become substantially rectilinear.

8. Support for keeping in expanded condition an elastic sleeve for covering elongated cylindrical elements such as electrical cable joints and comprising a tape wound spirally in side-by-side turns so as to take on a cylindrical tubular form and means of mutual constraint between the turns to hold the tape in wound condition and characterized in that the tape and the constraint means are made of different materials, the tape is made of an elastic material having an elasticity modulus greater than 150.000 MPa and the elastic material is steel.

9. Support in accordance with claim 8 wherein the steel is harmonic spring steel.

10. Process for the realization of an elastic covering sleeve assembly for covering elongated cylindrical electrical elements and characterised in that it comprises the steps of:

making a support by:

providing a tape of an elastic material having an elasticity modulus of at least 150.000 MPa, spirally winding the tape on a cylindrical arbour with side-by-side turns, and constraining together the side-by-side turns by means of a constraint which is a material different from the tape material;

applying an elastic sleeve on the support in radially expanded condition.

11. Process in accordance with claim 10, wherein making the support comprises the steps of:

providing the tape in an elastic material having an elasticity modulus of at least 150.000 MPa, extruding on said tape an encircling layer of thermoplastic covering material, winding on the arbour the tape bearing the layer of extruding covering, heating the covering layer to the softening limit of the thermoplastic material; and applying a pressure on the covering layer before it cools to achieve heat welding of material at the edges of the adjacent turns together.

12. Process in accordance with claim 11 and including the phase of applying a coat of adhesive on the tape before extruding thereon the layer of covering.

13. Process for the realization of an elastic covering sleeve assembly for covering elongated cylindrical elements such as elastic cable joints and characterized in that it comprises the steps of:

making a support by:

providing a tape of an elastic harmonic spring steel having an elasticity modulus of at least 150.000 MPa, extruding on said tape a layer of thermoplastic covering material, spirally winding the tape with the covering layer of thermoplastic material on a cylindrical arbour with side-by-side turns, heating the covering layer to the softening limit of the thermoplastic material, and applying a pressure on the covering layer before it cools to achieve heat welding of the adjacent turns;

applying an elastic sleeve on the support in radially expanded condition.

* * * * *